United States Patent [19]

Reimann et al.

[11] Patent Number: 5,366,000

[45] Date of Patent: Nov. 22, 1994

[54] METHOD AND APPARATUS FOR FORMING RINGS FROM AN ACTIVE BRAZING ALLOY

[75] Inventors: Peter Reimann, Buckten; Heinz Breitenstein, Bättwil; Stephan Messmer, Allschwil, all of Switzerland

[73] Assignee: Endress u. Hauser GmbH u. Co., Germany

[21] Appl. No.: 25,264

[22] Filed: Mar. 2, 1993

[30] Foreign Application Priority Data

Mar. 5, 1992 [EP] European Pat. Off. ........ 92810172.4

[51] Int. Cl.$^5$ ............................................. B22D 11/06
[52] U.S. Cl. ................................... 164/463; 164/423
[58] Field of Search ................ 164/423, 463, 429, 479

[56] References Cited

U.S. PATENT DOCUMENTS 4,124,664  11/1978  Maringer ............................ 164/463

FOREIGN PATENT DOCUMENTS 0332978  9/1989  European Pat. Off. .
60-21162  2/1985  Japan .
1595621  9/1990  U.S.S.R. ............................ 164/479

OTHER PUBLICATIONS

H. H. Liebermann, "Helical Glassy Alloy Ribbons: Fabrication and Magnetic Properties", Materials Science and Engineering, pp. 185–191, 1981.

"Metallic Glasses", American Society for Metals, five pages, 1976.

*Primary Examiner*—Kuang Y. Lin
*Attorney, Agent, or Firm*—Barnes & Thornburg

[57] ABSTRACT

The method for forming rings of uniform thickness from an active brazing alloy by melt-spinning the liquid alloy has the following steps: The alloy is liquefied in a crucible having a lateral opening whose height is approximately equal to the width of the ring material; the liquid alloy is forced out of the crucible onto the side surface of a metal drum of high thermal conductivity at a radial distance from the drum center approximately equal to the ring diameter, said metal drum rotating at a high circumferential velocity at a distance from the crucible approximately equal to the ring thickness; after an„,approximately quarter to three-quarter turn of the active brazing alloy solidified on the metal drum into ring material, the latter is lifted off the metal drum by a mechanical deflector or a gas stream blown onto it in a direction opposite to the direction of rotation of the metal drum, and guided past the crucible; the ring helix being formed is guided around a lateral, coaxial extension of the metal drum which is located on one side of the crucible, serves as a winding mandrel, and has an end flange and a diameter slightly smaller than the inner diameter of the rings, and from the ring helix, the rings are cut off.

8 Claims, 3 Drawing Sheets

METHOD AND APPARATUS FOR FORMING RINGS FROM AN ACTIVE BRAZING ALLOY

FIELD OF THE INVENTION

The present invention relates to a method of forming rings of uniform thickness from an active brazing alloy by melt spinning the liquid alloy, and to a melt-spinning apparatus for forming said rings.

BACKGROUND OF THE INVENTION

Melt spinning serves to fabricate metal ribbons or tapes, mostly from alloys which, if produced by techniques other than melt spinning, are brittle. By melt spinning, however, they can be produced as ductile and, thus, machinable ribbons or tapes, since they are a solidified liquid like glass. Therefore, they are also referred to as "metallic glasses".

In the book "Metallic Glasses—Papers presented at a Seminar of the Materials Science Division of the American Society for Metals, Sept. 18 and 19, 1976", American Society for Metals, Ohio, Jan. 1978, pages 36 to 38, an apparatus for producing metallic glasses in ribbon form is described in connection with the schematic of FIG. 1 on page 38.

In that process, a jet of molten alloy is forced out of a crucible onto the side surface of a metal drum of high thermal conductivity rotating at a high circumferential velocity, the crucible being disposed above the metal drum at a distance approximately equal to the metal drum diameter. After solidification of the melt, the ribbon separates from the metal drum.

In the journal "Materials Science and Engineering", Vol. 49, 1985, pages 185 to 191, a method of forming a ribbon helix from a metallic glass is described in connection with FIG. 1 on page 185. A jet of the molten alloy is impinged at an angle different from 90° onto the side surface of a metal drum of high thermal conductivity rotating at a high circumferential velocity, and the helix formed, after becoming detached from the metal drum, is guided around the rear side surface facing away from the impingement side surface.

As experiments by the inventors have shown, a main problem in the fabrication of the above-mentioned helical ribbons and, consequently, in the formation of rings of uniform thickness and width to be cut therefrom consists in the following: It must be ensured that during the very short time that the alloy is quenched on the metal drum, separates from the metal drum, and coils to form the helix, the individual windings of the helix are not overstretched by plastic deformation or not bonded together, which would result in a sort of ribbon clew that would be difficult to separate into the individual rings. This problem arises particularly during the formation of rings from an active brazing alloy which is brittle without the use of the melt-spinning technique.

SUMMARY OF THE INVENTION

Accordingly, the solution to this problem, on the one hand, consists in a method of forming rings of uniform thickness and width from an active brazing alloy by melt-spinning the liquid alloy, comprising the following steps: The alloy is liquefied in a crucible having a lateral opening whose height is approximately equal to the width of the ring material; the liquid alloy is forced out of the crucible onto the side surface of a metal drum of high thermal conductivity at a radial distance from the drum center approximately equal to the ring diameter, said metal drum rotating at a high circumferential velocity at a distance from the crucible approximately equal to the ring thickness; after an approximately quarter to three-quarter turn of the active brazing alloy solidified on the metal drum into ring material, the latter is lifted off the metal drum by a mechanical deflector or a gas stream blown onto it in a direction opposite to the direction of rotation of the metal drum, and guided past the crucible; the ring helix being formed is guided around a lateral, coaxial extension of the metal drum which is located on one side of the crucible, serves as a winding mandrel, and has an end flange and a diameter slightly smaller than the inner diameter of the rings, and from the ring helix, the rings are cut-off.

On the other hand, the solution to the above problem consists in a melt-spinning apparatus for forming rings of uniform thickness from an active brazing alloy, comprising a metal drum of high thermal conductivity rotating at a high circumferential velocity, a crucible having a lateral opening whose height is approximately equal to the width of the ring material and which is located adjacent to the side surface of the metal drum at a distance approximately equal to the ring thickness and at a radial distance from the drum axis approximately equal to the ring diameter, a mechanical deflector extending immediately adjacent to the side surface of the metal drum at an angle of 90° to 270° with respect to the opening of the crucible, and a lateral, coaxial extension of the metal drum which is located on the side of the crucible, serves as a winding mandrel for the ring helix being formed, and has an end flange and a diameter slightly smaller than the inner diameter of the rings.

The solution to the above problem further consists in a melt-spinning apparatus for forming rings of uniform thickness from an active brazing alloy, comprising a metal drum of high thermal conductivity rotating at a high circumferential velocity, a crucible having a lateral opening whose height is approximately equal to the width of the ring material and which is located adjacent to the side surface of the metal drum at a distance approximately equal to the ring thickness and at a radial distance from the drum axis approximately equal to the ring diameter, a gas-conducting tube extending radially and parallel to the side surface of the metal drum at an angle of about 90° to 270° with respect to the opening of the crucible and having a longitudinal slot from which a gas issues tangentially in a direction opposite to the direction of rotation of the metal drum, and a lateral, coaxial extension of the metal drum which is located on the side of the crucible, serves as a winding mandrel for the ring helix being formed, and has an end flange and a diameter slightly smaller than the diameter of the rings.

In one embodiment of the method of the invention, the liquefying is accomplished by heating the crucible by means of high-frequency energy, e.g., by surrounding the crucible with a coil.

For example, the active brazing alloy is a ternary active brazing material based on a zirconium-nickel alloy composed of 70 atom% to 85 atom% zirconium and 15 atom% to 30 atom% nickel, and contains titanium in addition to the zirconium nickel alloy. The zirconium-nickel alloy preferably has a near-eutectic composition, whereby a range around the eutectic composition (=24 atom% nickel, 76 atom% zirconium) of ±5 atom% is to be understood; the eutectic zirconium-nickel alloy is particularly suited, of course.

In one embodiment of the apparatus of the invention, the crucible is made completely of a high-temperature and highly thermally conductive nonmetallic material, particularly of high-density graphite or boron nitride.

The rings formed in accordance with the invention can be used in pressure sensors having a substrate and a diaphragm of ceramic, particularly alumina ceramic, preferably with a purity of 96 wt.%, which are thermally joined together around the periphery in a defined spaced relationship and parallel to each other by means of such a ring of active brazing material, thus forming a chamber.

BRIEF DESCRIPTION OF THE DRAWINGS

The invention and its further characteristics will now be explained in more detail with reference to the accompanying drawings, which show schematically two melt-spinning apparatuses and, as a preferred example of the use of the rings of active brazing material, the construction of a capacitive pressure sensor. Throughout the figures, like parts are designated by like reference characters.

DETAILED DESCRIPTION OF THE INVENTION

Figure 1:
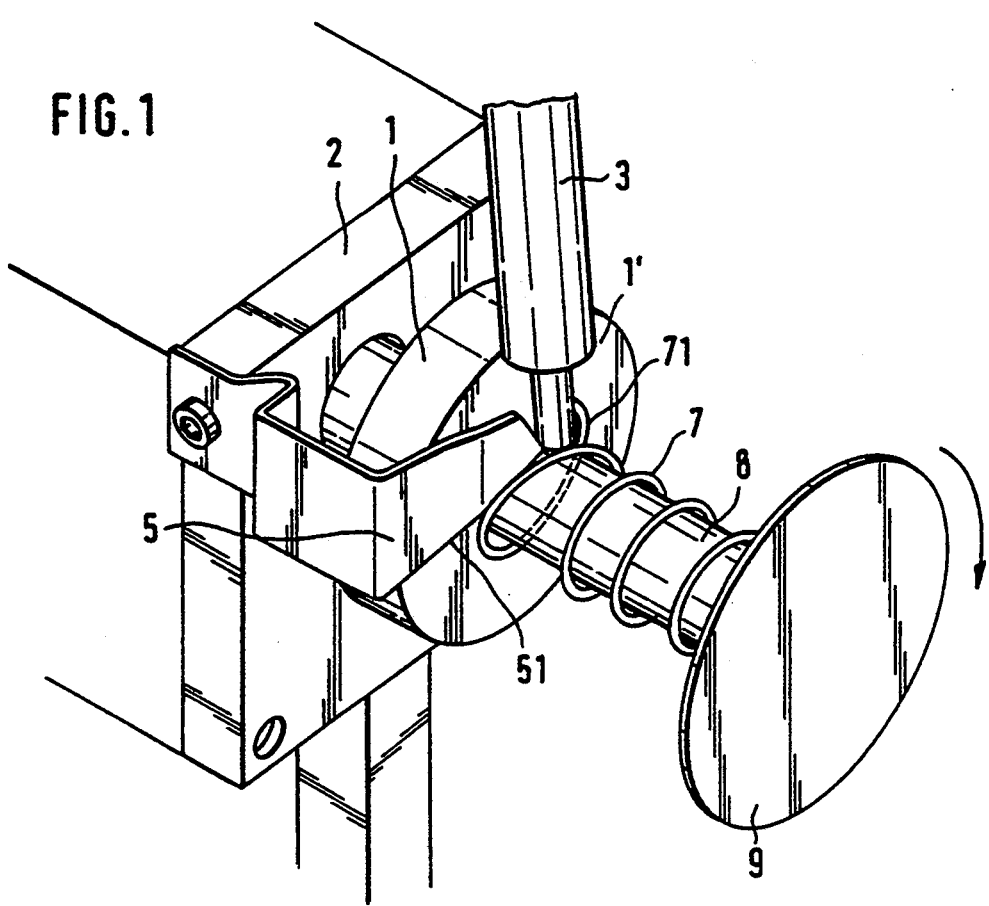
FIG. 1 is a schematic perspective view of a first variant of a melt-spinning apparatus.

The perspective view of FIG. 1 shows the essential details of a first variant of a melt-spinning apparatus for forming rings 20 of uniform thickness (cf. FIG. 5) from an active brazing alloy. A metal drum 1 of high thermal conductivity which is rotatably mounted in a bearing block 2 is rotated at a high speed by a motor (not shown), as is indicated by the arrow showing the direction of rotation.

The high thermal conductivity is achieved, for example, by making the metal drum 1 completely from copper or coating the side surfaces of the metal drum 1 with copper. The metal drum 1 may also be cooled from inside with a cooling liquid, e.g., water. By this design of the metal drum 1 and the high speed of rotation, cooling rates of the liquid alloy on the order of $10^3$ to $10^6$ °C/s can be achieved.

Figure 3:
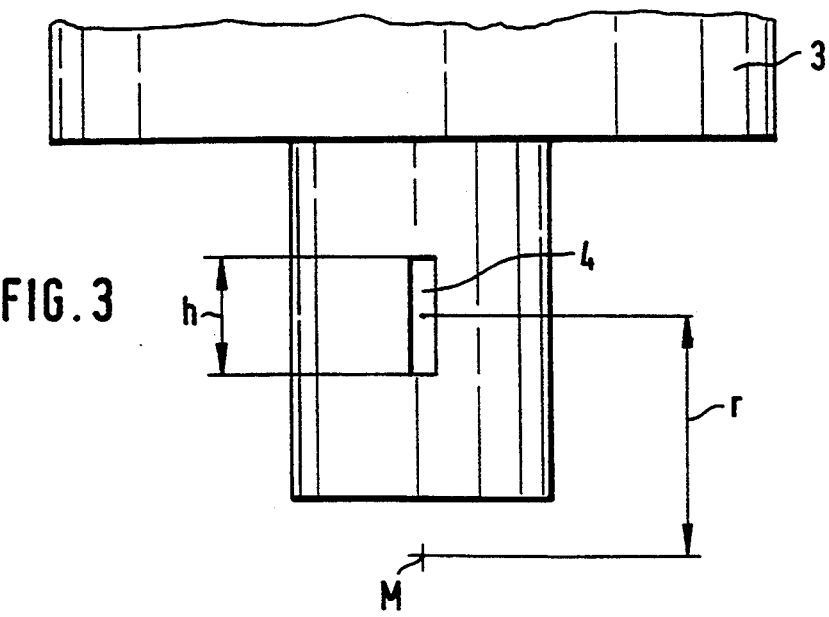
FIG. 3 is an enlarged view of the sidewall of the crucible of FIGS. 1 and 2 with the opening representing the outlet for the liquified alloy.

Mounted beside one side surface 1' of the metal drum 1 is a crucible 3 which has a lateral opening 4, whose details are shown in FIG. 3. The height h of the opening 4 is approximately equal to the width of the rings 20. The opening 4 is located in close lateral proximity to the side surface 1' of the metal drum 1 at a distance therefrom which is approximately equal to the ring thickness. The center of the opening 4 is separated from the drum axis M by a radial distance r approximately equal to the ring diameter.

The crucible 3 is preferably made completely of a high-temperature and highly thermally conductive, nonmetallic material. High-density graphite or boron nitride have proved especially suitable. In the crucible 3, the active brazing material is heated and liquified, e.g., by means of high-frequency energy. To this end, the crucible 3 is surrounded by a coil, for example, which is not shown in FIGS. 1 and 2 to simplify the illustration.

A mechanical deflector 5 with a sharp edge 51 extends immediately adjacent to the side surface 1' of the metal drum. Sharp edge 51 of mechanical deflector 5 is configured to lift off a portion 71 of the active brazing alloy formed on metal drum 1 after the metal drum 1 has rotated through an angle of about 90° to 270° with respect to the opening 4 of the crucible 3. The ring helix being formed, 7, because of the curvature impressed on it by the metal drum 1 and because of the pitch impressed on it by the deflector 5, coils around a winding mandrel 8 which is formed by a lateral, coaxial extension of the metal drum 1 and has an end flange 9 for limiting the coiling process. The diameter of the winding mandrel 8 is slightly smaller than the inner diameter of the rings. A further bearing lock may be provided behind the end flange 9 if necessary.

Figure 2:
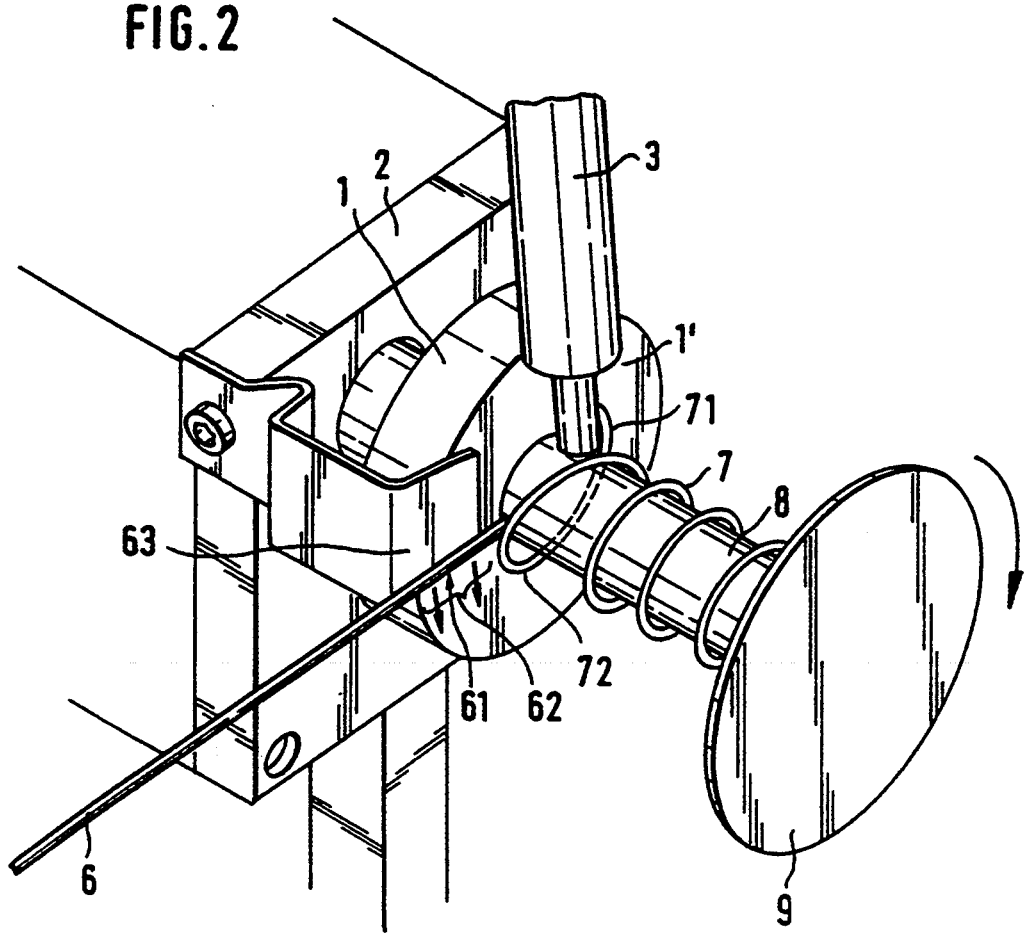
FIG. 2 is a schematic perspective view of a second variant of a melt-spinning apparatus.

The perspective view of FIG. 2 shows the essential details of a second variant of a melt-spinning apparatus for forming rings 20 (cf. FIG. 5) of uniform thickness from an active brazing alloy. This variant differs from that of FIG. 1 in that instead of the deflector 5, a gas-conducting tube 6 is provided which has a longitudinal slot 61—in FIG. 2 at its underside—from which a gas 62, e.g., air, nitrogen, or a suitable inert gas, issues under pressure tangentially to the side surface 1' of the metal drum 1, i.e., opposite to the direction of rotation of the metal drum. The tube 6 is secured to a supporting member 63.

In the variant of FIG. 2, too, the ring helix being formed, 7, coils around the winding mandrel 8 with the end flange 9, namely because of the curvature impressed on it by the metal drum 1 and because of the pitch impressed on it by the gas stream 62. The winding mandrel 8 and the end flange 9 are of the same design as in FIG. 1.

In FIGS. 1 and 2, that portion 71 of the ring helix 7 can be seen which forms on the metal drum 1 immediately after the discharge of the Liquid alloy from the opening 4 of the crucible 3. After the metal drum 1 has turned through an angle of about 90° to 270° from the opening 4, the portion 72 of the ring helix 7 has formed, which now begins to separate from the metal drum 1. From the ring helix 7, the rings 20 are cut off.

Figure 4:
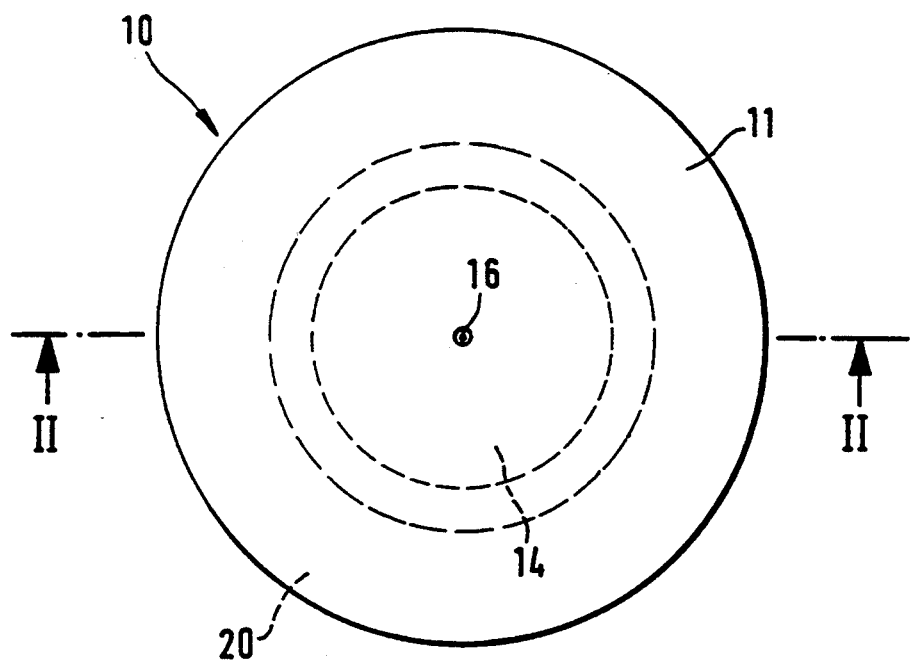
FIG. 4 is a schematic top view of a pressure sensor.
Figure 5:
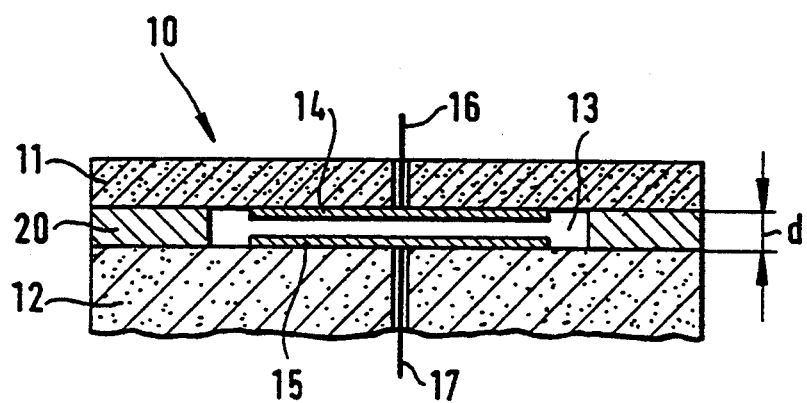
FIG. 5 is a section taken along line II—II of FIG. 4.

The rings 20 fabric cared by means of the above apparatus using the method explained can be employed capacitive pressure sensors. Such a pressure sensor 10 is illustrated in FIGS. 4 and 5. It has a diaphragm 11 in the form of a circular disk with plane-parallel surfaces which is joined around the periphery to a circular substrate 12 in a defined spaced relationship d, so that a chamber 13 is formed between the flat top side of the substrate 12 and the opposite side of the diaphragm 11. The diaphragm 11 and the substrate 12 are made of ceramic, e.g., alumina ceramic, preferably with a purity of 96 wt.%. The diaphragm 11 is elastic, so that it can deform when pressure is applied to it, whereby it deflects toward one side or the other. The substrate 12 may be solid and rigid; if necessary, it may also be a flat elastic disk like the diaphragm 11.

Within the chamber 13, those surfaces of the diaphragm 11 and the substrate 12 which face each other are provided with circular conductive layers 14, 15 of a suitable metal, e.g., tantalum, which lie opposite each other. Connected to the conductive layer 14 is a lead 16 which is fed through the diaphragm 11 in a gas-tight manner, e.g.:, in the form of a soldered-in wire covered with active brazing material. Similarly, the conductive layer 15 has a lead 17 connected thereto which is also brought out in a gas-tight manner.

The conductive layers 14, 15 form the electrodes of a capacitor whose capacitance depends on the distance between the conductive layers. When the diaphragm 11 deforms under pressure, the distance between the conductive layers changes, thereby changing the capacitance of the sensor. This capacitance can be measured by means of an electronic circuit connected to the leads 16, 17 and is a measure of the pressure on the sensor.

For the sake of completeness it should be mentioned that there are also sensors with more than two electrodes. For example, one of the two surfaces may support two concentric electrodes which, together with the common opposite electrode, form two capacitors having a common electrode which can be used, for example, as a measuring capacitor and a reference capacitor, respectively.

The peculiarity of the pressure sensor shown consists in the way the diaphragm 11 and the substrate 12 are joined together around the periphery. They are brazed together there in a gas-tight manner by means of a ring 20 made as described above, without the respective surfaces of the diaphragm 11 and the substrate 12 having to be metallized or without the need for a flux. The thickness of the ring 20 determines the distance between the diaphragm 11 and the substrate 12.

Such pressure sensors are typical distortion-sensitive components; they should exhibit no or only negligible temperature hysteresis of electrical characteristics in a temperature range of, e.g., −40° C. to +130° C. If the coefficients of thermal expansion of the ceramic and the active brazing material are not sufficiently close together, the active brazing material will be plastically and, thus, irreversibly deformed during operation in this temperature range, and the ceramic may even break off in one place and another. As a result, the spatial association of the sensor parts will change, even though only slightly. This new configuration, however, results in different electrical characteristics. Since the latter represent the measurand, e.g., a pressure, the sensor now exhibits a (undesired) temperature hysteresis.

To avoid this temperature hysteresis, the active brazing material must thus have a coefficient of thermal expansion which is ideally equal to that of the ceramic or the single crystal, i.e., which actually comes as close as possible to the latter coefficient.

In the above-mentioned pressure sensors, the high static strength and high fatigue strength under alternating stresses of the active brazing material based on a zirconium-nickel alloy titanium can be readily proved: In creep tests at elevated temperatures, e.g., 130° C., and under rated pressure and in overload impact tests, no changes in sensor data were observed over long test times.

We claim:

1. A method of forming rings of substantially uniform thickness from an active brazing allow by melt-spinning the liquid alloy, the method comprising the following steps:
   liquefying the alloy in a crucible having a lateral opening whose height is approximately equal to the width of the ring material;
   forcing the liquid alloy out of the crucible onto a side surface of a metal drum of high thermal conductivity at a radial distance from the drum center approximately equal to the ring diameter, said metal drum rotating at a high circumferential velocity at a distance from the crucible approximately equal to the ring thickness;
   lifting the active brazing alloy which has solidified on thermal drum into ring material off the metal drum after an approximately quarter to three-quarter turn of the metal drum to form a ring helix;
   guiding the ring helix around a lateral, coaxial extension of the metal drum which serves as a winding mandrel, and has an end flange and a diameter slightly smaller than the inner diameter of the rings; and
   cutting off rings from the ring helix.

2. A method as claimed in claim 1 wherein the liquefying is accomplished by heating the crucible by means of high-frequency energy.

3. The method of claim 1, wherein the lifting step is performed by a sharp-edged mechanical deflector.

4. The method of claim 1, wherein the lifting step is performed by a gas stream blown onto the solidified active brazing alloy in a direction opposite to the direction of rotation of the metal drum.

5. A melt-spinning apparatus for forming rings of substantially uniform thickness from an active brazing alloy, the apparatus comprising:
   a metal drum of high thermal conductivity rotating at a high circumferential velocity,
   a crucible having a lateral opening whose height is approximately equal to the width of the ring material and which is located adjacent to a side surface of the metal drum at a distance approximately equal to the ring thickness and at a radial distance from the drum axis approximately equal to the ring diameter,
   a sharp-edge mechanical deflector extending immediately adjacent to the side surface of the metal drum, the deflector being positioned at an angle of 90° to 270° with respect to the opening of the crucible, and
   a lateral, coaxial extension of the metal drum which serves as a winding mandrel for a ring helix being formed, and has an end flange and a diameter slightly smaller than the inner diameter of the rings.

6. A melt-spinning apparatus for forming rings of substantially uniform thickness from an active brazing alloy, the apparatus comprising;
   a metal drum of high thermal conductivity rotating at a high circumferential velocity,
   a crucible having a lateral opening whose height is approximately equal to the width of the ring material and which is located adjacent to a side surface of the metal drum at a distance approximately equal to the ring thickness and at a radial distance from the drum axis approximately equal to the ring diameter,
   a gas-conducting tube extending radially and parallel to the side surface of the metal drum, the tube being positioned at an angle of about 90° to 270° with respect to the opening of the crucible and having a longitudinal slot from which a gas issues tangentially in a direction opposite to the direction of rotation of the metal drum, and
   a lateral, coaxial extension of the metal drum which serves as a winding mandrel for a ring helix being formed, and has an end flange and a diameter slightly smaller than the diameter of the rings.

7. An apparatus as claimed in claim 5 wherein the crucible is made completely of a high-temperature and highly thermally conductive, nonmetallic material, particularly of high-density graphite or boron nitride.

8. An apparatus as claimed in claim 6 wherein the crucible is made completely of a high-temperature and highly thermally conductive, nonmetallic material, particularly of high-density graphite or boron nitride.

* * * * *